United States Patent
Lin et al.

(10) Patent No.: US 8,081,388 B2
(45) Date of Patent: Dec. 20, 2011

(54) PHOTOELECTRIC LENS MODULE AND FABRICATION THEREOF

(75) Inventors: Chien-Feng Lin, Hsinchu (TW); Cheng-Yu Huang, Taoyuan County (TW); Chi-Yin Lin, Taichung County (TW); Chi-Cheng Chiou, Miaoli County (TW)

(73) Assignee: Pacific Speed Limited, Wanchai (HK)

( * ) Notice: Subject to any disclaimer, the term of this patent is extended or adjusted under 35 U.S.C. 154(b) by 0 days.

(21) Appl. No.: 12/760,058

(22) Filed: Apr. 14, 2010

(65) Prior Publication Data

US 2011/0255179 A1 Oct. 20, 2011

(51) Int. Cl.
*G02B 27/00* (2006.01)
(52) U.S. Cl. ........................................ 359/642; 359/796
(58) Field of Classification Search .................. 359/642, 359/741, 796, 797
See application file for complete search history.

(56) References Cited

U.S. PATENT DOCUMENTS

| 6,947,224 | B2* | 9/2005 | Wang et al. | 359/742 |
| 2003/0011889 | A1* | 1/2003 | Harden et al. | 359/642 |
| 2011/0002053 | A1* | 1/2011 | Ovrutsky et al. | 359/738 |

* cited by examiner

*Primary Examiner* — Darryl J Collins
(74) *Attorney, Agent, or Firm* — Muncy, Geissler, Olds & Lowe, PLLC

(57) ABSTRACT

A photoelectric lens module is utilized to focus a light source. A fabrication method comprises steps of providing a first substrate; positioning a plurality of gap units on the first substrate, and forming a plurality of gap regions amongst the gap units on the first substrate; providing a second substrate comprising a plurality of photoelectric lens units, in which the positions of the photoelectric lens units are corresponding to the locations of the gap regions; and filling a transparent rubber in the gap regions in such that the first substrate and the second substrate are adhered closely.

7 Claims, 4 Drawing Sheets

PHOTOELECTRIC LENS MODULE AND FABRICATION THEREOF

FIELD OF THE INVENTION

The present invention relates to a structure of focusing light device and its fabrication method, and more particularly to a structural design of photoelectric lens module and its fabrication method.

BACKGROUND OF THE INVENTION

The conventional photoelectric conversions are made from lens and photoelectric converting units. The photoelectric lens is utilized to focus the light onto the photoelectric converting units so that the light can be converted into electrical energy, wherein the photoelectric converting units are formed on the substrate during the fabrication process. Since the photoelectric converting units are used for the outdoor purpose, they are easily subjected to the weathering conditions, such as the sun exposedness or raining, can have a drastically effect on the surfaces of the lens units. Further since the materials of the lens units have low degree of hardness, they are easily damaged through the outdoor weathering conditions.

In addition, to resolve the above-mentioned problems, the conventional photoelectric converters provides a high hardness substrate to adhere the surfaces of the lens units. However, in the adhesive process, an air bubble may enter into an adhesive object that causing the light dispersion, scattering, interference and diffraction and effect the photoelectric conversion.

SUMMARY OF THE INVENTION

One object of the present invention is to provide a fabrication method of the photoelectric lens module for making the first substrate and the second substrate be adhered closely via a transparent rubber and a plurality of gap units.

Another object of the present invention is to provide a photoelectric lens module for focusing a light, wherein the photoelectric lens module have a plurality of gap units between a first substrate and a second substrate so that forming a plurality of gap regions amongst the gap units on the first substrate, the first substrate and the second substrate are adhered closely via filling a transparent rubber in the gap regions.

The other object of the present invention is to provide a photoelectric lens module, a fixed height of the transparent rubber filled between the gap regions of the first substrate and the second substrate is predetermined via a plurality of gap regions.

To achieve the above object, the fabrication method of the photoelectric lens module according to the present invention comprises steps of (i) providing a first substrate; (ii) positioning a plurality of gap units on the first substrate, and forming a plurality of gap regions amongst the gap units on the first substrate; (iii) providing a second substrate comprising a plurality of photoelectric lens units, in which the positions of the photoelectric lens units are corresponding to the locations of the gap regions; and (iv) filling a transparent rubber in the gap regions in such that the first substrate and the second substrate are adhered closely.

To achieve the above object, the present invention provides a photoelectric lens module, capable of focusing a light source, comprises a first substrate, a plurality of gap units, a second substrate and a transparent rubber, wherein the plurality of gap units are located on the first substrate to form a plurality of gap regions amongst the gap units on the first substrate. A plurality of photoelectric lens units are formed on the second substrate, wherein an incident light is focused through the photoelectric lens units to one side of the photoelectric lens units, and a plurality of gap regions formed corresponding to those photoelectric lens units. The transparent rubber is filled between the gap regions, wherein the first substrate and the second substrate are adhered closely to each other via the transparent rubber.

Compare to the conventional technologies, the present invention provides an improved method of fabrication of an improved photoelectric lens module. The improved photoelectric lens module of the present invention consists of a property of high numbers of modules so that when one part of the lens units is damaged, it can be replaced easily. Further, the transparent rubber designed in between the substrates provides an excellent adhesive layer to assembly and adhere the first substrate closely to the photoelectric lens units of second substrate in such that light energy lost is prevented, and the improved photoelectric lens module further consists of high durable characteristic.

These features and advantages of the present invention will become more fully apparent from the following description and appended claims, or may be learned by the practice of the invention as set forth thereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that theses drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS

Figure 1:
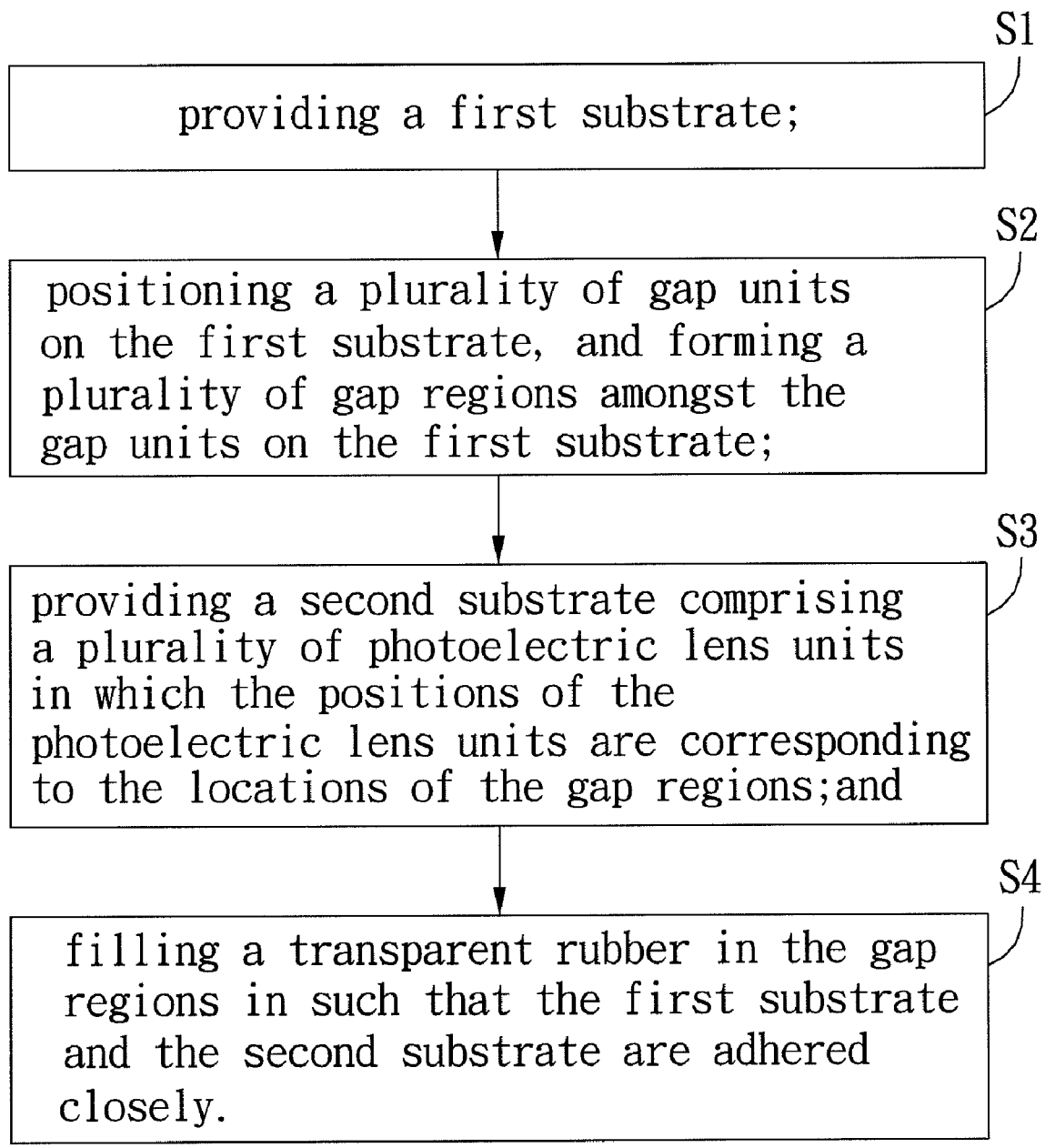
FIG. 1 shows a flow chart of a manufacturing process of a photoelectric lens module in accordance with a preferred embodiment of the present invention.

For the purpose of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Refer to FIG. 1, a flow chart of a manufacturing process of a photoelectric lens module in accordance with a preferred embodiment of the present invention. The manufacturing process of the photoelectric lens module comprises steps of: S1 providing a first substrate; S2 positioning a plurality of gap units that are arranged with equal spaces around the first substrate in such that a plurality of equal gap regions are formed between the gap units; S3 providing a second substrate having a plurality of photoelectric lens units, wherein those photoelectric lens units are correspondingly to the equal gap regions; and S4 filling transparent rubber in the equal gap regions so that the thickness of the transparent rubber adhered to the first substrate and the second substrate closely.

Figure 2A:
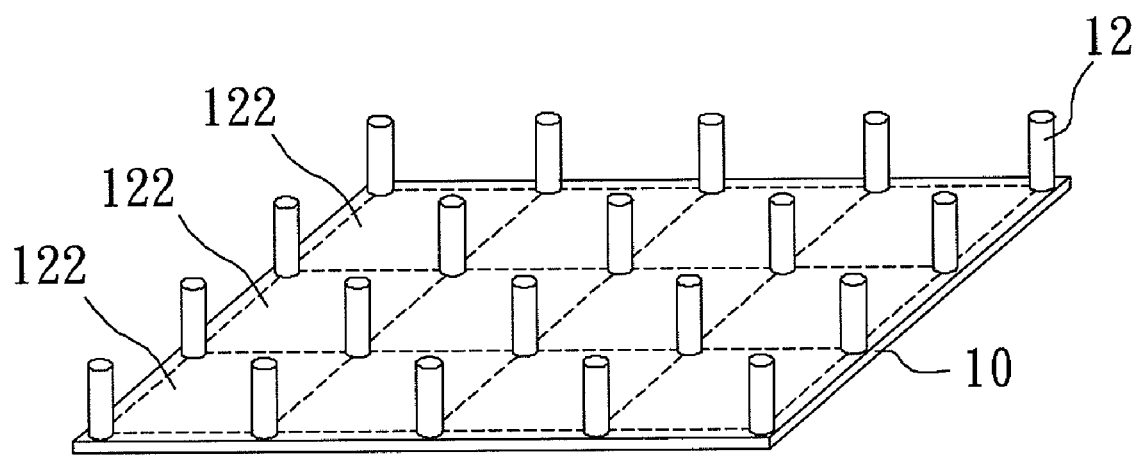
FIGS. 2a-2d show schematic views of the photoelectric lens module in accordance with a preferred embodiment of the present invention.
Figure 2B:
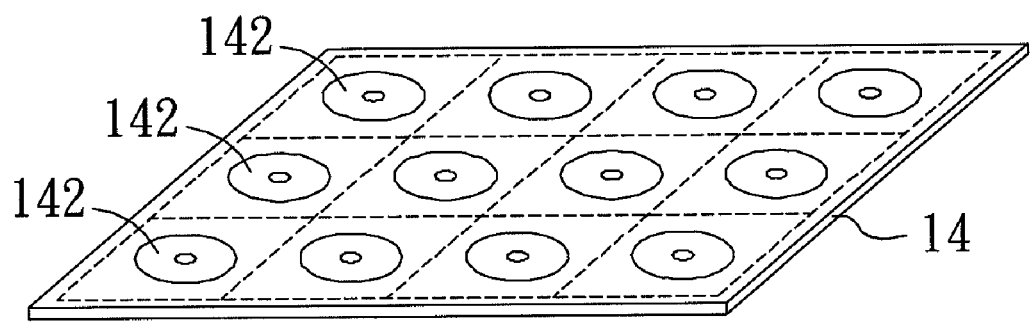
Figure 2C:
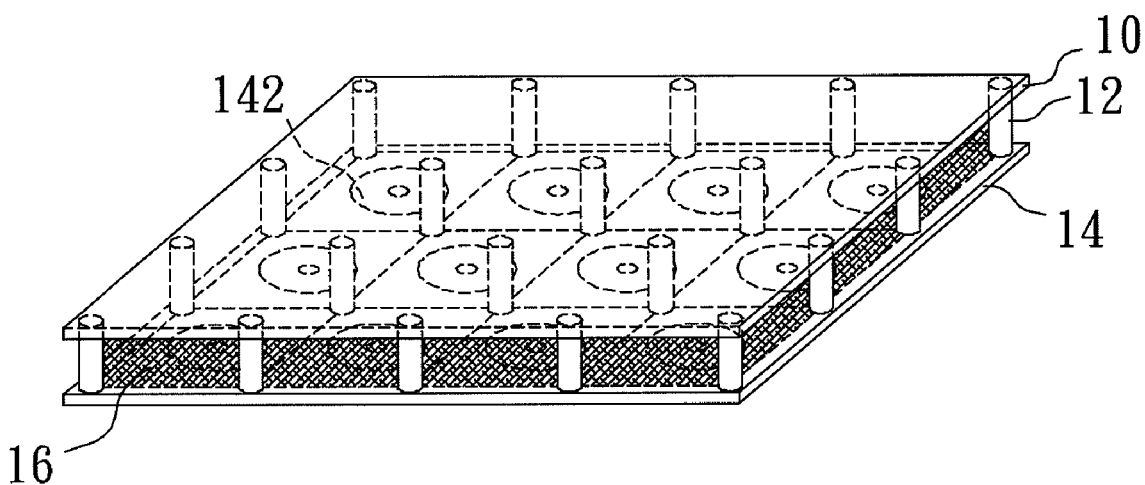

Refer to FIGS. 2a-2d, schematic views of the photoelectric lens module in accordance with a preferred embodiment of the present invention are illustrated. The photoelectric lens module comprises a first substrate 10, a plurality of gap units 12, a second substrate 14 and a transparent rubber 16. The gap units 12 are installed on the first substrate 10 in such that a plurality of gap regions 122 is formed as shown in FIG. 2a. The gap units 12 can be designed in circular shape or other similar shapes, and it is made from a group of materials consisting of plastic, Teflon®, Acrylic or glass. The first substrate 10 is made from glass, tempered glass or Acrylic. A plurality of photoelectric lens units 142 is positioned on the second substrate 14 in which the photoelectric lens units 142 are utilized to focus the light from the incident light source IL to one side of the photoelectric lens units 142.

Figure 2D:
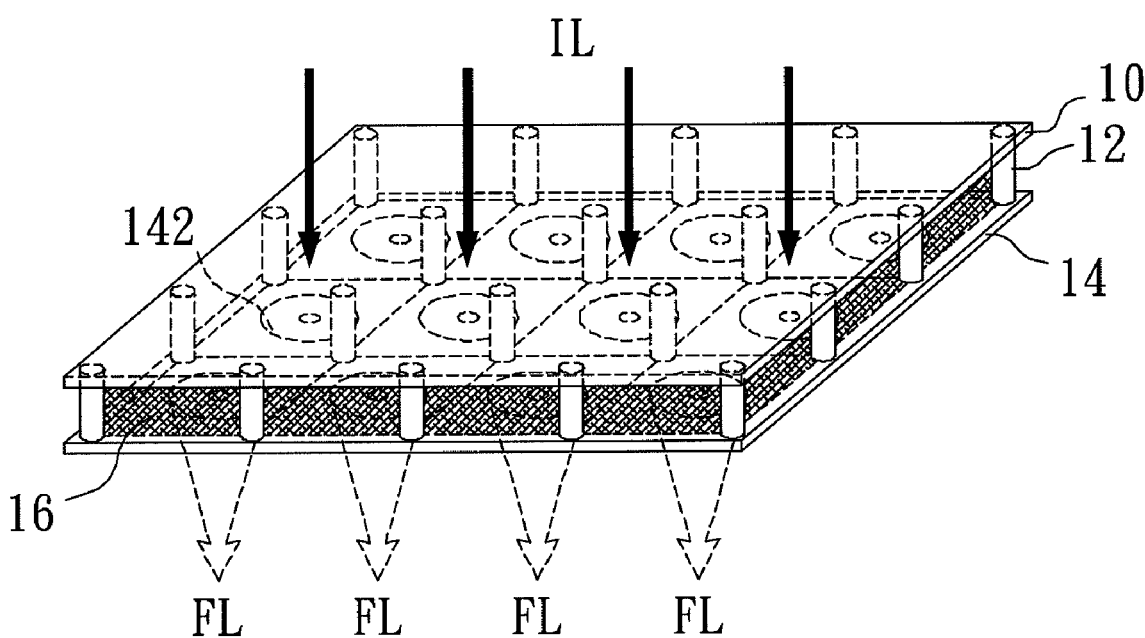

Refer to FIG. 2d, the positions of the photoelectric lens units 142 are correspondingly to the locations of the gap regions 122. The photoelectric lens units 142 and the gap regions 122 are integrally assembled to the first substrate 10, the gap units 12, the second substrate 14 and the photoelectric lens units 142 to form the photoelectric lens module shown in FIG. 2c. The integration of the second substrate 14 and the first substrate 10 results the formation of corresponding and equal gaps of gap regions 122, the first substrate 10 and the second substrate 14 are adhered closely with each other by filling the transparent rubber 16 into the gaps of gap regions 122. Particularly, the gap units 12 of the present invention is designed to provide a pre-determined height of the transparent rubber 16 inside the gaps of the gap regions 122 in such that the adhesive gap between the first substrate 10 and the second substrate 14 is narrowed down to a degree that the air bubble are all eliminated so that when the incident light source IL projects through the transparent rubber 16, no dispersion, scattering, interference and diffraction will occur.

The photoelectric lens module of the present invention utilizes a transparent rubber 16 with properties of high coefficient of transparency and low coefficient of thermal expansion positioned between the first substrate 10 and the second substrate 14 so that when the incident light source IL incident passes through the first substrate 10 to the second substrate 14, the light energy of the incident light source IL will not be reduced or tempered during the transmission through the substrates 10 & 14. When the light energy of the incident light source IL passes through the transparent rubber 16 of the substrates 10 & 14, the heat energy is generated and can result the light energy being lost or wasted through the transmission due to the thermal expansion and contraction effects on the transparent rubber material. This design of the photoelectric lens module of the present invention effectively preserves the light energy of the incident light source IL through the whole transmission process by constructing the thickness of the transparent rubber less than 1 mm.

Refer to FIG. 2d, the incident light of the incident light source IL is transmitted from the first substrate 10 to the transparent rubber 16, and is focused at another side of the photoelectric lens units 142 to form a focusing light FL via the photoelectric lens units 142 of the second substrate 14, wherein the focusing light FL is used to restrict the incident light source IL to a particular region.

Figure 3A:
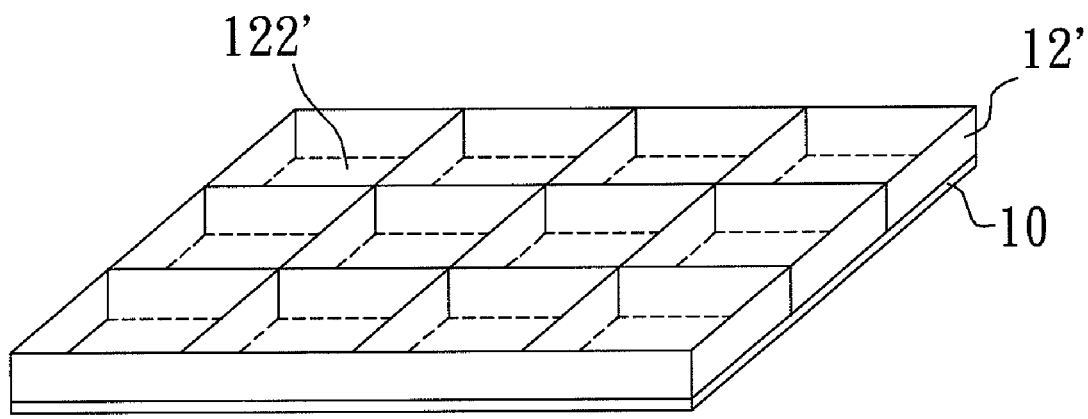
FIGS. 3a-3b schematic views show a photoelectric lens module in accordance with another preferred embodiment of the present invention.
Figure 3B:
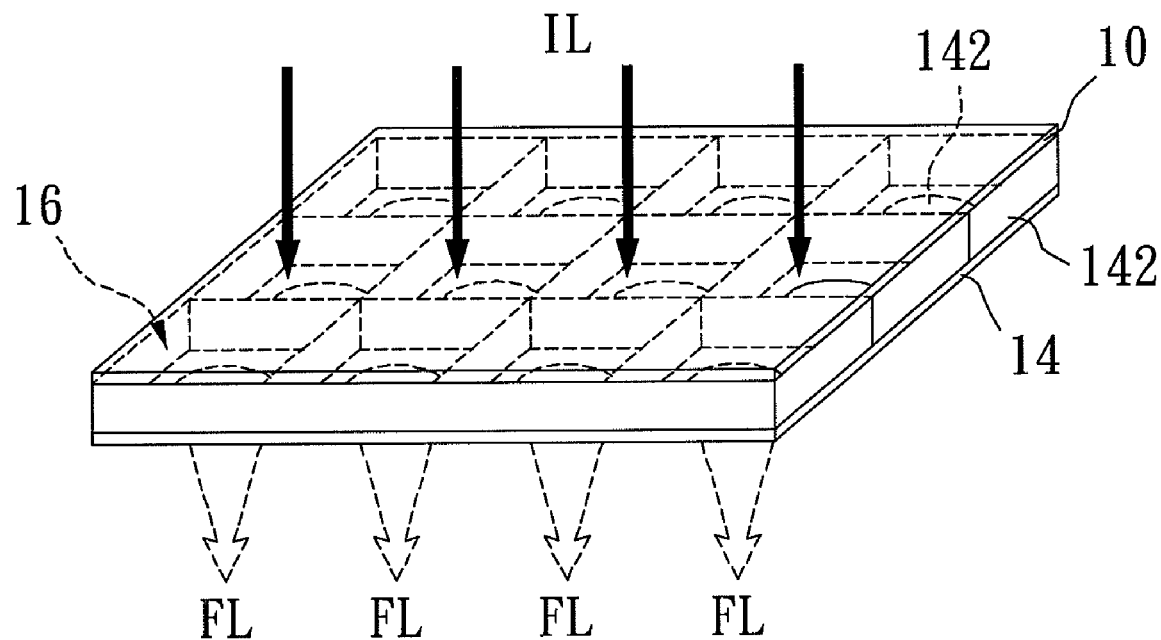

Refer to FIGS. 3a-3b, schematic views show a photoelectric lens module in accordance with another preferred embodiment of the present invention. The photoelectric lens module of the present invention comprises a first substrate 10, a plurality of gap units 12', a second substrate 14 and a transparent rubber 16, wherein the gap units 12' are fabricated into thin and flat pieces (sheets) and are used to create a plurality of gap regions 122'. The light from the incident light source IL incident passes through the first substrate 10 into the transparent rubber 16 and fall onto the second substrate 14, and the incident light is focused and projected onto one side of the photoelectric lens units 142 via the photoelectric lens units 142 of the second substrate 14 to form a focusing light FL in such that the incident light of the incident light source IL is limited to one particular region of the photoelectric lens module.

Compare to the conventional technologies, the present invention provides an improved method of fabrication of an improved photoelectric lens module. The improved photoelectric lens module of the present invention consists of a property of high numbers of modules so that when one part of the lens units is damaged, it can be replaced easily. Further, the transparent rubber designed in between the substrates provides an excellent adhesive layer to assembly and adhere the first substrate closely to the photoelectric lens units of second substrate in such that light energy lost is prevented, and the improved photoelectric lens module further consists of high durable characteristic.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features; which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method of fabricating a photoelectric lens module, comprising:

providing a first substrate;

positioning a plurality of gap units on the first substrate, and forming a plurality of gap regions amongst the gap units on the first substrate;

providing a second substrate comprising a plurality of photoelectric lens units, in which the positions of the photoelectric lens units are corresponding to the locations of the gap regions; and filling a transparent rubber with coefficient of transparency and coefficient of thermal expansion in the gap regions in such that the first substrate and the second substrate are adhered closely, wherein the height of the transparent rubber filled in between the gap regions of the first substrate and the second substrate is less than 1 mm.

2. A photoelectric lens module, capable of focusing a light source, comprising:

a first substrate;

a plurality of gap units located on the first substrate to form a plurality of gap regions amongst the gap units on the first substrate;

a second substrate, having a plurality of photoelectric lens units, wherein a incident light is focused through the photoelectric lens units to one side of the photoelectric lens units, and a plurality of gap regions formed corresponding to those photoelectric lens units; and a transparent rubber, filled between the gap regions, wherein the transparent rubber with coefficient of transparency and coefficient of thermal expansion is used to adhere the first substrate and the second substrate closely to each other, and the height of the transparent rubber filled in between the gap regions of the first substrate and the second substrate is less than 1 mm.

3. The photoelectric lens module of claim 2, wherein a fixed height of the transparent rubber filled between the gap regions of the first substrate and the second substrate is predetermined.

4. The photoelectric lens module of claim 2, wherein the first substrate is made of Acrylic or glass.

5. The photoelectric lens module of claim 2, wherein gap units are made of plastic, Teflon®, Acrylic or glass.

6. The photoelectric lens module of claim 2, wherein the first substrate is tempered glass.

7. The photoelectric lens module of claim 2, the gap regions are made into sheet-shaped units or circular-shaped units.

* * * * *